United States Patent

[11] 3,584,209

| [72] | Inventor | Ivan La-Garde<br>Chelmsford, Mass. |
|---|---|---|
| [21] | Appl. No. | 817,943 |
| [22] | Filed | Apr. 21, 1969 |
| [45] | Patented | June 8, 1971 |
| [73] | Assignee | The United States of America as represented by the Secretary of the Navy |

[54] INTEGRATING ANALOG MEMORY
4 Claims, 4 Drawing Figs.

[52] U.S. Cl. .................................................. 235/183,
340/173, 328/127
[51] Int. Cl. .................................................. G06g 7/18
[50] Field of Search .......................................... 235/183,
150.4; 340/173, 248 A, 253, 411, 412, 413; 320/1;
328/127, 151

[56] References Cited
UNITED STATES PATENTS

| 3,079,086 | 2/1963 | Galli et al. ................... | 235/183X |
| 3,205,345 | 9/1965 | Gruet ........................... | 235/150.4X |
| 3,231,729 | 1/1966 | Stern ............................ | 235/150.4X |
| 3,370,159 | 2/1968 | Fogarty et al. ................ | 235/183X |
| 3,383,501 | 5/1968 | Patchell ....................... | 235/183X |

Primary Examiner—Malcolm A. Morrison
Assistant Examiner—Joseph F. Ruggiero
Attorneys—Edgar J. Brower and H. H. Losche

ABSTRACT: An integrating analog memory circuit having a pair of switchable memory means for reading out memorized signals in one and combining with the new received signals for writing of the combined output into the other memory means, each input to the combining means being weighted, to detect a change by integration weighting means to detect a change in the mean energy level of new signals in a population of signals, many of which are varying as a result of amplitude modulation, and means for comparing the readout memory with the new signal to produce an alarm whenever the new signal exceeds the mean energy level of the memorized signal.

INVENTOR
IVAN LA GARDE

BY H. H. Losche
ATTORNEY

INTEGRATING ANALOG MEMORY

BACKGROUND OF THE INVENTION

This invention relates to analog integrating memory circuits and more particularly to a means for rapidly detecting the occurrence of a new signal present in a population of received signals by combining weighted new signals with weighted memorized signals to produce an alarm whenever new signal amplitude exceeds the mean signal amplitude level of the memorized signals.

Comparator type devices are known to evaluate two signals in amplitude, frequency, or time duration but neglect the performance subject to time variations; such as, whether the signals are increasing or decreasing with respect to past or prior signals. Prior devices utilize such comparator means as a differential amplifier with switched input and storage network input signals to produce an output signal of a polarity to indicate which of the signals is greater and with a magnitude proportional to the extent of the difference between the signals. The disadvantage with this device is that there is no time integration for amplitude and frequency information.

SUMMARY OF THE INVENTION

In this invention a memory means, such as a beam storage tube or any short term analog memory device, is used to provide a write-in section and a readout section, or used in duplicate with alternate switching means to read out a memorized prior signal for combination with a new signal and the combination output read into the memory device. With each new signal the two memory components are switched to alternate readout and read-in. Each new signal and memory readout signal pair is fed via weighting networks to provide a low percentage of the new input signal and the complementary percentage of the memory signal, thus providing a normalized output for the next memory read-in. The input signal is also compared directly with the memory readout to produce an alarm signal whenever the input signal exceeds the mean level of the memorized signal by a predetermined minimum ratio.

In order to reduce the dynamic range of the input signals, a modification of the invention conceives the use of lin-log conversion units in the input to both comparator and combiner circuits. These lin-log units provide outputs to the comparator and combiner that are logarithmically related to the input values which maximizes the effective dynamic range of the memory means while not restricting the comparator or combiner circuits. The net effect of this modified form of memory system is to provide improved performance, measured in terms of the probability of detection and the probability of false alarm. It is therefore a general object of the invention to provide an analog integrating memory device to rapidly detect the occurrence of a new signal in a population of signals, many of which are varying as a result of amplitude modulation.

BRIEF DESCRIPTION OF THE DRAWING

These and other objects and the attendant advantages, features, and uses, will become more apparent to those skilled in the art as a more detailed description proceeds when considered along with the accompanying drawings, in which.

DESCRIPTION OF THE PREFERRED EMBODIMENT

Figure 1:
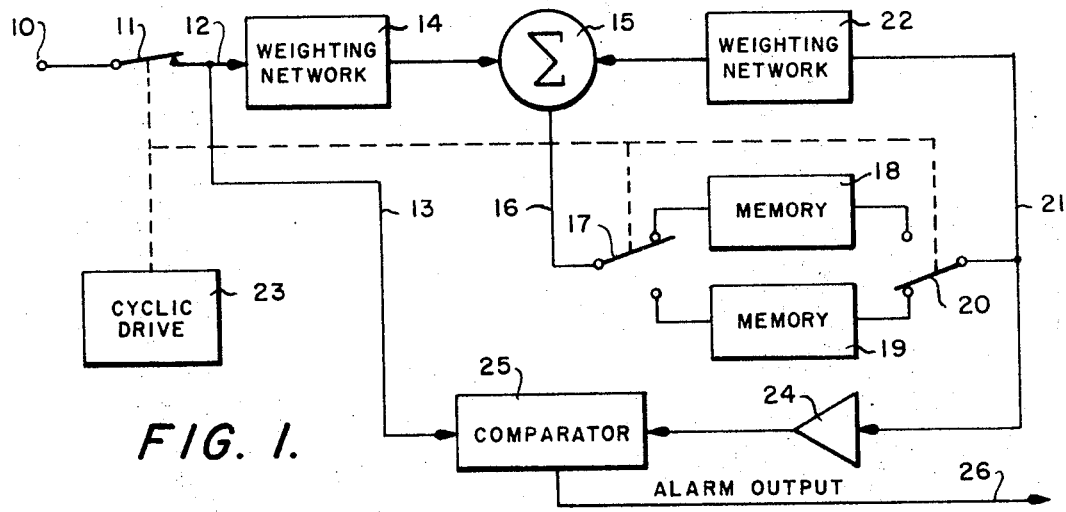
FIG. 1 is a block circuit schematic diagram of the integrated analog memory.

Referring more particularly to FIG. 1 there is shown an input terminal 10 to the integrating analog memory circuit adapted to receive signals from a receiver device each signal of which is the detected envelope of a signal derived from a filter sweeping the frequency band of interest. Terminal 10 is coupled through a switch 11 to branch conductors 12 and 13. Conductor 12 is coupled through a weighting network 14, to a summing or combiner circuit 15. An output 16 from the summing circuit 15 is coupled to the switch blade of a read-in or "write" switch 17 coupling memory devices 18 and 19, alternately. The memory devices 18 and 19 may be electron beam storage tubes, but any short term analog memory devices could be used as desired. The outputs of the memory devices are coupled to contacts of a readout or "read" switch 20, the switch blade of which is coupled by means of conductor 21 through a weighting network 22 to a second input of the summing circuit 15. The weighting networks 14 and 22 are in the form of simple resistor networks designed to pass a predetermined proportion of the weighting network input signal of any well-known type more fully shown and described in the text, *Radar System Analysis* by David K. Barton (1964) published by Prentice Hall, Inc., pages 417—420. The switches 11, 17, and 20 are all driven by a cyclic driver 23 in a manner to close switch 11 whenever the read-in switch 17 and the readout switch 20 are alternately positioned to contact memory circuits 18 and 19, respectively. That is, when the read-in switch 17 is thrown to read in to memory 18, the readout switch 20 will be thrown to read out memory 19, and vice versa. Switch 11 will make contact for each alternate switched position of the read-in and readout switches 17 and 20.

The other branch circuit 13 from the input 10 is applied as one input to a comparator circuit 25, the other input coming from the conductor 21 through an amplifier 24 as the second input to the comparator 25. The output on 21 is the readout of either the memory 18 or memory 19 and this memory signal is amplified in 24, either memory signal application to the comparator 25 being compared with the input signal at terminal 10. An alarm output signal will be developed on the output conductor 26 whenever the input signal at terminal 10 exceeds the amplified output of the memory signal by a predetermined amplitude. The input and memorized signals may likewise include noise. As hereinbefore described each new input signal applied to terminal 10 will be conducted to the weighting network 14 and to the summing circuit 15 to be summed or compared with the prior read-in memorized signal in memory 19 and this summed or compared signal will be conducted by way of conductor 16 through the read-in switch 17 to the memory 18. Each readout of the memory circuits 18 or 19 will be destructive so the memory of the memory means will be of the type to reduce the memory to zero after readout. The new memorized signal will be the detected change in the mean energy level and this new mean energy level of the signal will be placed in the memory circuit. With a predetermined change in a new signal amplitude over the amplified memory signal in the comparator 25, an alarm signal on the output 26 will be produced. Since the device acts as an integrator by virtue of the resistor-capacitor components in the weighting networks of the type shown on page 418 of the above-noted text, *Radar System Analysis*, it has an associated time constant and within the constraints of this time constant the level recorded in memory for any signal will be independent of its amplitude modulation. The choice of time constant is a parameter controlled principally by the weighting networks 14 and 22. The weighting, determined by networks 14 and 22, will be low percentage of the input and the complementary percentage of the memory signal, thus providing a normalized output.

Figure 2:
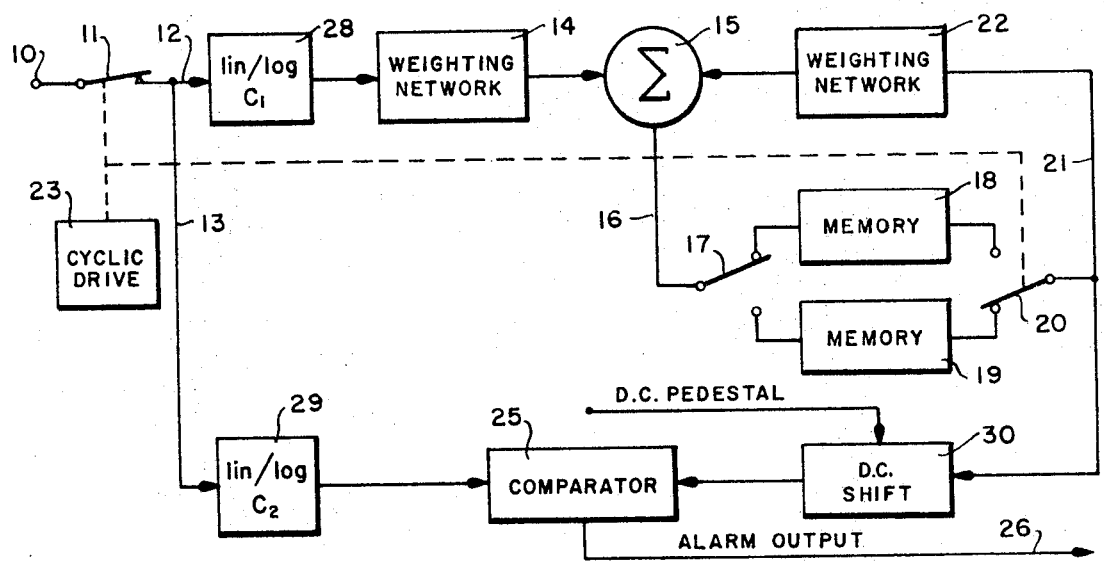
FIG. 2 is a block circuit schematic diagram of a modified embodiment of the device of FIG. 1.
Figure 3:
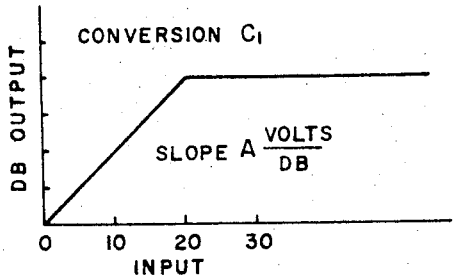
FIGS. 3 and 4 are conversion characteristics of the lin-log circuits C1 and C2 used in the embodiment shown in FIG. 2.
Figure 4:
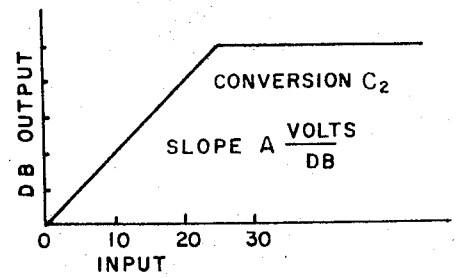

Referring more particularly to FIG. 2, the circuit in this figure is similar to the circuit of FIG. 1 except that each branch circuit 12 and 13 includes a lin-log network identified by the reference characters 28 and 29. Likewise, the parts in FIG. 2 with corresponding parts in FIG. 1, are identified by like reference characters. The lin-log circuits 28 and 29 are used to minimize the dynamic range requirements of the memory while not restricting the comparator circuit 25. Any well-known lin-log circuit may be used for this purpose, such as those more fully described in the Radiation Laboratory Series of MIT, Volume 23, on *Microwave Receivers* (1948), McGraw-Hill Book Co., Inc. Section 21.3 (page 583½). The lin-log conversion network 28 provides an output that is logarithmically related to input values between a minimum and some intermediate level suited to the dynamic range of the input signal. The lin-log conversion network 29 provides a logarithmic output for input values between the minimum and a level several decibels above the maximum associated with the lin-log network 28, this differential relative to 28 being at least equal to the required alarm differential produced on the output of the comparator 25. The relationship of the decibel outputs of the conversion outputs 28 and 29 are further identified relatively as C1 and C2, as shown in FIGS. 3 and 4, respectively.

A further change in FIG. 2 from the device shown in FIG. 1 is the use of a direct current (DC) shift circuit 30 to which a DC biasing or pedestal voltage is applied to bias the memorized signal. The net effect of this modified embodiment of the memory system is to provide improved performance measured in terms of the probability of detection and the probability of false alarm as a function of noise present at the readout memory. This embodiment works very well for high signal-to-noise ratios, the limiting factor in performance being noise at the memory readout.

OPERATION

In the operation of the device shown in FIGS. 1 and 2, input signals will be summed or combined through the weighting networks 14 and 22 with a prior memorized readout signal and the new input signal, being the mean value after combination or summation with the last signal, will be read into the memory for later readout. The memory device 18 or 19 will accordingly always memorize the last mean value of the received signal plus noise for comparison with subsequent signal plus noise signals. Any apparent increase of the new signal over the last memory signal a predetermined amount will produce an alarm out of the comparator 25 on the output 26. This integrator analog memory circuit with its modified embodiment provides a new ratiometric signal detection for detecting signals in noise signals for radar detection of enemy targets, or the like.

While many modifications and changes may be made in the constructional details and features of this invention without departing from the principal concept, it is pointed out that I desire to be limited in the spirit of my invention only by the scope of the appended claims.

I claim:
1. An analog integration memory circuit comprising:
   first and second memory means, each having a read-in input and a readout output:
   a switch means in each input and output to alternately switch the input of one memory means with the output of the other memory means;
   an input of signals;
   a combiner having one input coupled to said input of signals, another input coupled to said switch means in the output of said memory means, and an output coupled to said switch means in the input of said memory means;
   first and second weighting networks in each of said one and other inputs of said combiner; and
   a comparator having one input coupled to said input of signals, a second input coupled to the switch means in the output of said memory means, said second input including means to proportion the readout memorized signal, and an output to produce an alarm signal whenever the one input signal exceeds said second input signal whereby input signals are compared with prior memorized readout signals and the sum and difference therefrom read in to said memory means to maintain a mean value of input signals.

2. An analog integrating memory circuit as set forth in claim 1 wherein
   said first and second memory means are electron beam storage tubes.

3. An analog integrating memory circuit as set forth in claim 2 wherein
   said inputs to said first weighting means and to said comparator each includes a lin-log converter network to convert the input signals to intermediate levels suited to the dynamic range of the input signals.

4. An analog integrating memory as set forth in claim 3 wherein
   said signal input is switched and coupled to said switching means to switch said signal input for an input of signal for each alternate switching operation of said switching means.